Figure 1:
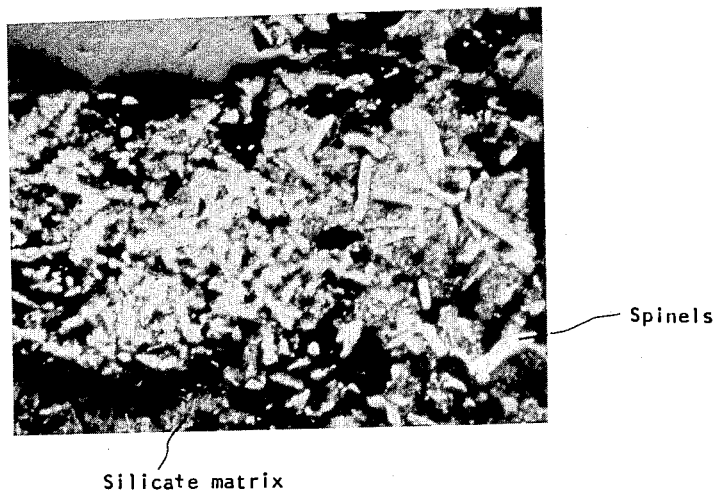
Figure 2:
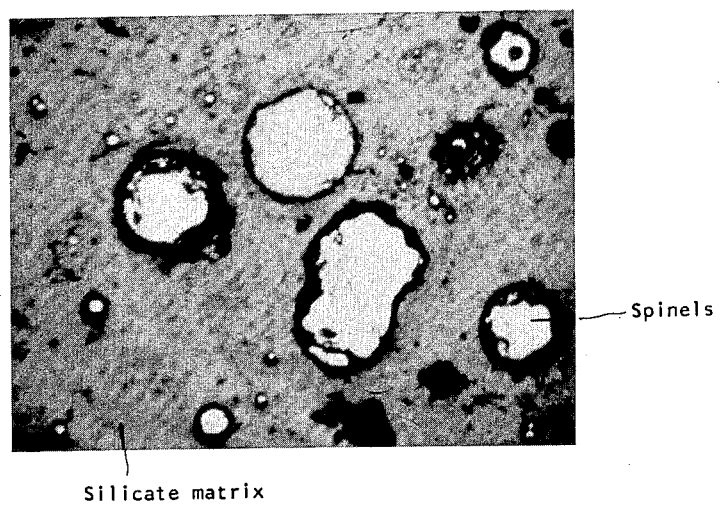

United States Patent [19]

Najjar

[11] Patent Number: 4,889,658

[45] Date of Patent: Dec. 26, 1989

[54] PARTIAL OXIDATION PROCESS

[75] Inventor: Mitri S. Najjar, Hopewell Junction, N.Y.

[73] Assignee: Texaco Inc., White Plains, N.Y.

[21] Appl. No.: 208,929

[22] Filed: Jun. 20, 1988

Related U.S. Application Data

[63] Continuation-in-part of Ser. No. 51,982, May 19, 1987, Pat. No. 4,826,627, and a continuation-in-part of Ser. No. 62,018, Jun. 15, 1987, Pat. No. 4,801,438, and a continuation-in-part of Ser. No. 100,673, Sep. 24, 1987, Pat. No. 4,808,386.

[51] Int. Cl.$^4$ .................................................. C07C 3/36
[52] U.S. Cl. .................................. 252/373; 218/197 R
[58] Field of Search ............................................ 252/373

[56] References Cited

U.S. PATENT DOCUMENTS

| | | | |
|---|---|---|---|
| 4,801,438 | 1/1989 | Najjar | 423/230 |
| 4,808,386 | 2/1989 | Najjar | 423/226 |
| 4,826,627 | 5/1989 | Najjar | 252/373 |

*Primary Examiner*—Bruce Gray
*Attorney, Agent, or Firm*—Robert A. Kulason; James J. O'Loughlin; Albert Brent

[57] ABSTRACT

Synthesis gas is produced by the partial oxidation of a feedstock comprising a high silicon and sulfur-containing heavy liquid hydrocarbonaceous fuel and/or petroleum coke or tar sands having nickel and vanadium-containing ashes in admixture with a silicon and manganese-containing ash fusion temperature modifying agent in a vertical free-flow unobstructed reaction zone lined with a refractory which comprises in wt. %: silicon-containing material about 95 to 99.8, iron oxide about 0.1 to 1.0, $Al_2O_3$ about 0.1 to 1.0, CaO about 0 to 0.4, and others about 0 to 1.2. In the reaction zone separate portions of said silicon and manganese-containing additive (i) combine with a portion of said Fe, Ni, and S to generate a first liquid phase washing agent which washes a portion of the high melting vanadium and oxide phases from the reaction zone, (ii) combine with a portion of said Ni, Ca, Si, Al, Mg and Na and/or K to generate a liquid oxide-silicate phase that fluxes and washes substantially all of the remaining vanadium and other ash components, and (iii) combine with a portion of the molten ash from the fuel and a minor portion of the refractory lining said reaction zone to increase the amount of said liquid oxide silicate phase and thereby enhance the removal of the vanadium from said reaction zone. By this method molten slag having a reduced viscosity and containing the nickel and vanadium-containing impurities from the feedstock and refractory components are readily removed from the gas generator.

29 Claims, 1 Drawing Sheet

FIELD OF VISION = 1.1mm

SPINELS IN SILICATE MATRIX

Spinels

Silicate matrix

FIELD OF VISION = 0.6mm

SPINELS IN A SILICATE MATRIX

Spinels

Silicate matrix

PARTIAL OXIDATION PROCESS

This is a continuation-in-part of copending applications Serial No. 07/051,982 filed May 19, 1987; Now U.S. Pat. No. 4,826,624 Ser. No. 07/062,018 filed June 15, 1987; and Ser. No. 07/100,673 filed Sept. 24, 1987, now U.S. Pat. No. 4,808.386.

FIELD OF THE INVENTION

This invention relates to the simultaneous partial oxidation and desulfurization of high silicon and sulfur-containing heavy liquid hydrocarbonaceous fuels, high silicon and sulfur-containing petroleum coke or tar sands, or mixtures thereof to produce gaseous mixtures comprising $H_2+CO$. More particularly it pertains to an additive-refractory combination for removing nickel and vanadium-containing contaminants along with other molten ash components which are produced during the partial oxidation of a high silicon and sulfur-containing heavy liquid hydrocarbonaceous fuel and/or high silicon and sulfur-containing petroleum coke or tar sands each having a nickel and vanadium-containing ash to produce synthesis gas, reducing gas, or fuel gas.

The partial oxidation of liquid hydrocarbonaceous fuels such as petroleum products and slurries of solid carbonaceous fuels such as coal and petroleum coke are well known processes. However, troublesome molten slags are produced along with the product gas in the free-flow unobstructed vertical reaction zone of the partial oxidation gas generator. At the high temperature e.g. about 2200° F. to 3000° F. prevailing in the reaction zone, the highly corrosive molten slag attacks the refractory which lines the reaction zone. Lining failures have sometimes occurred within a few hundred hours. For example, magnesite and alumina-rich refractories have little resistance to slag attack while gasifying high silicon and sulfur-containing petroleum coke and/or heavy liquid hydrocarbonaceous fuels. A compatible additive-refractory system is provided by the subject invention wherein the molten slag is modified by contact with the refractory so that it runs more freely from the gasifier. The refractory lining resists substantial corrosion, erosion, and chemical attack by the additive modified molten slag. The life of the refractory lining is extended. Costly down-times for replacement of the refractory lining are thereby avoided.

Previous gasification runs with delayed coke and/or ash-containing heavy liquid hydrocarbonaceous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel oxide and nickel sulfide downstream in the system. Fluxing as used in coal operations and in U.S. Pat. Nos. 1,799,885 and 2,644,745 does not provide a solution to applicants' problem involving troublesome vanadium and nickel. The subject invention is an improvement in the art since it permits long time operation of the partial oxidation gas generator without shut-down due to failure of the refractory lining in the reaction zone that was brought about by the presence of vanadium.

The foreseeable trend for petroleum reserves is that the produced crude will be increasingly heavier and of poorer quality. To compensate for this trend, refiners must employ more "bottom of the barrel" upgrading to provide the desired light products. The current industry workhouse to provide this upgrading is some type of coking operation (either delayed or fluid). A good deal of current refinery expansion includes the installation or expansion of coker units; and thus, coking will be a process of general use for some time to come. Since the crudes contain more contaminants, i.e. sulfur, metals (predominately vanadium, nickel, and iron) and ash, and these contaminants are concentrated in the product coke, this coke is of a much poorer quality and is excluded from its normal product applications. Because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

In the subject improved invention, the partial oxidation reaction zone is lined with a silicon-containing refractory that is compatible with an ash fusion temperature modifying material comprising a mixture of a silicon-containing material and a manganese-containing material. By this means, molten slag is produced having an increased fluidity and substantially no sticking to the silicon-containing refractory liner.

SUMMARY OF THE INVENTION

This is a process for the production of gaseous mixtures comprising $H_2+CO$ by the partial oxidation of a feedstock comprising a high silicon and sulfur-containing heavy liquid hydrocarbonaceous fuel having a nickel and vanadium-containing ash, or a high silicon and sulfur-containing petroleum coke or tar sands having a nickel and vanadium-containing ash, or mixtures thereof; and said feedstock includes a minimum of 0.5 wt. % sulfur and more than about 20,000 parts per million (ppm) of silicon, such as in the range of about 50,000 parts per million (ppm) to about 150,000 ppm of silicon; and said ash includes a minimum of 5.0 wt. % of vanadium, such as about 5.0 to 20 wt. %; a minimum of 2.0 wt. % of nickel, such as about 2.0 to 20 wt. %; and a minor amount of calcium and sodium e.g. less than about 5 wt. % of the ash. The process includes the steps of:

(1) mixing together said feedstock and an ash fusion temperature modifying agent comprising a silicon-containing material in the amount of about 30 to 90 wt. % and the remainder substantially comprising a manganese-containing material; wherein the weight ratio of said ash fusion temperature modifying agent to ash in the reaction zone in (2) is in the range of about 0.5-7.0 to 1.0, and there is at least 5 parts by weight of ash fusion temperature modifying agent for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2+CO$ and entrained molten slag; wherein said refractory lining comprises in weight percent: silicon-containing material in the range of about 95 to 99.8, iron oxide about 0.1 to 1.0, $Al_2O_3$ about 0.1 to 1.0, CaO about 0 to 0.4, and others about 0 to 1.2; and where simultaneously in said reaction zone separate portions of the said ash fusion temperature modifying agent (i) combine with a portion of said iron, nickel, and sulfur to generate a liquid phase washing agent which washes a portion of the high melting vanadium and oxide phases from the reaction zone, (ii) combine with a portion of said nickel, calcium, silicon, aluminum, magnesium and sodium and/or potassium to generate a liquid oxide-silicate phase that fluxes and washes substantially all of the remaining vanadium and other ash components, and (iii) combine with a portion of the molten ash from the fuel and a minor portion of the refractory lining said reaction zone to increase the amount of said liquid oxide silicate phase and thereby enhance the removal of the vanadium from said reaction zone; and (3) separating nongaseous materials from said hot raw effluent gas stream.

In one embodiment, a mixture of high silicon sulfur-containing heavy liquid hydrocarbonaceous fuel containing more than about 20,000 ppm of silicon and having a nickel and vanadium-containing ash and an ash fusion temperature modifying agent comprising a silicon-containing material in the amount of about 30 to 90 wt. % and the remainder of said agent substantially comprising a manganese-containing material is fed to a coker unit to produce petroleum coke with a nickel and vanadium-containing ash, and with said ash fusion temperature modifying agent being uniformly dispersed throughout the petroleum coke. This unique petroleum coke is then reacted in a partial oxidation gas generator lined with a refractory which is rich in a silicon-containing material to produce synthesis gas, reducing gas, or fuel gas.

In another embodiment, a minor amount of an additional material comprising an element selected from the group consisting of magnesium, chromium, iron, and mixtures thereof is introduced into the reaction zone. These additional elements further increase life of the refractory by forming a spinel before the vanadium interacts with the refractory. In still another embodiment, a minor amount of an additional material comprising an element selected from the group consisting of calcium, sodium, iron, and mixtures thereof is introduced into the reaction zone. These additional elements increase the fluidity of the slag. These additional materials are provided as compounds in the total amount of about 1.0 to 10.0 wt. % of the ash fusion temperature modifying agent. The aforesaid compounds are selected from the group consisting of oxides, hydroxides, carbonates, bicarbonates, sulfates, nitrates, and mixtures thereof. There is substantially no formation of elemental iron in the partial oxidation reaction zone.

DISCLOSURE OF THE INVENTION

The partial oxidation of heavy liquid hydrocarbonaceous fuel and petroleum coke are described respectively in coassigned U.S. Patent Numbers 4,411,670 and 3,607,156, which are incorporated herein by reference. Further, suitable free-flow vertical refractory lined gas generators and burners that may be used in the production of synthesis gas, reducing gas, or fuel gas from these materials are also described in the aforesaid references. Advantageously, the subject process uses relatively inexpensive feedstocks comprising high silicon and sulfur-containing heavy liquid hydrocarbonaceous fuel and/or petroleum coke or tar sands having nickel and vanadium-containing ashes. Further, said feedstock include a minimum of 0.5 wt. % of sulfur, such as at least 2.0 wt. % sulfur; and more than about 20,000 ppm, such as about 50,000 ppm to about 150,000 ppm of silicon; and said ash includes a minimum of 5.0 wt. % of vanadium, such as about 5.0 to 20.0 wt. %; a minimum of 2.0 wt. % of nickel, such as about 2.0 to 20.0 wt. %, and a minor amount of calcium and sodium e.g. less than 5 wt. % of the ash.

By definition, the term high silicon and sulfur-containing heavy liquid hydrocarbonaceous material or fuel having a nickel and vanadium-containing ash is a petroleum or coal derived fuel having the composition specified above and selected from the group consisting of virgin crude, residua from petroleum distillation and cracking, petroleum distillate, reduced crude, whole crude, asphalt, coal tar, coal derived oil, shale oil, oil sand, and mixtures thereof.

By definition, the term high silicon and sulfur-containing petroleum coke having a nickel and vanadium-containing ash is a petroleum coke made from ash containing high silicon and sulfur-containing heavy liquid hydrocarbonaceous fuel by conventional coking methods such as by the delayed or fluid coking process, such as described in coassigned U.S. Pat. No. 3,673,080, which is incorporated herein by reference.

Close study of the ashes derived from the partial oxidation, without an additive, of a feedstock comprising high silicon and sulfur-containing heavy liquid hydrocarbonaceous fuels and/or petroleum coke or tar sand having nickel and vanadium-containing ashes in a gas generator lined with a silicon-containing refractory shows that they are largely composed of oxide and sulfide compounds of vanadium, nickel, iron, along with some normally occurring mineral matter species. Vanadium-containing oxide laths are present and may be selected from the group consisting of V, V+Ca, V+Fe, V+Al, and mixtures thereof. Vanadium-containing spinels are present of the spinel-type aluminate phases and may include any metal selected from the group consisting of V, Fe, Cr, Al, Mg and mixtures thereof. The presence of abundant interlocking needle to lath-like crystals is the cause of the high viscosity of the slag. Advantageously, such interlocking is substantially absent in the slag from the subject process.

The metals present in the ash derived in the subject process provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10–20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally present as porphyrin type structures (metal atoms, oxides or ions thereof confined in an organic framework), are entrapped within the collapsed carbon matrix.

Problems arise when the heavy metal constituents build up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated. Further, the subject unique refractory lining the reaction zone of the gasifier withstands attack by the corrosive molten slag.

This invention pertains to the partial oxidation of a high silicon and sulfur-containing heavy liquid hydrocarbonaceous fuel and/or petroleum coke or tar sands, and provides an improved combination of an ash fusion temperature modifying agent and a silicon-containing refractory lining in the free-flow unobstructed vertical partial oxidation reaction zone. The ash fusion temperature modifying agent comprises a mixture of silicon-containing material in the amount of about 30 to 90 wt. % and the remainder of said agent substantially comprises a manganese-containing material. Further, a means of introducing the ash fusion temperature modifying agent into the system to give maximum effectiveness is provided. The refractory lining of the partial oxidation reaction zone has the following composition in wt. %: silicon-containing material about 95 to 99.8, iron oxide about 0.1 to 1.0, $Al_2O_3$ about 0.1 to 1.0, CaO about 0 to 0.4, and others selected from the group consisting of the oxides of titanium, zirconium, magnesium, and mixtures thereof in the amount of about 0 to 1.2. A fused cast refractory is preferred. While fused casts are more expensive and less resistant to thermal cracking, they offer reduced tendency for slag penetration.

The ash fusion temperature modifying agent comprises a silicon-containing material in admixture with a manganese-containing material. The ash fusion temperature modifying agent is described in coassigned U.S. Pat. No. 4,705,539, which is incorporated herein by reference. The silicon-containing material may be a material selected from the group consisting of fine silica, quartz, volcanic ash, coal ash, and mixtures thereof. The manganese-containing material may be any suitable manganese compound e.g. oxide, carbide, carbonate, hydroxide, silicate, silicide, sulfate, nitrate, and mixtures thereof. In the reaction zone of the partial oxidation gas generator, a first portion e.g. about 4.0 to 95 wt. %, such as about 10 to 30 wt. % of the total amount of said agent present combines with a portion, such as substantially all or a large fraction e.g. about 90 to 98 wt. of the nickel and about 30 to 90 wt. %, say about 50 to 70 wt. % of the iron and sulfur constituents found in the feedstock to produce a first low viscosity liquid phase washing agent or carrier. Minor amounts of other elements from the feedstock may be picked up by the first liquid phase washing agent and dissolved therein in the amount of about 1.5 to 7.0 wt. % of the first liquid phase washing agent. Accordingly, a minor amount of at least one extraneous element selected from the group consisting of Al, Ca, V, Mg, Na, K, and mixtures thereof may be optionally present in the first liquid phase washing agent. Simultaneously, a second portion of the ash fusion temperature modifying agent comprising a mixture of silicon and manganese-containing materials in an amount in the range of about 10 to 95 wt. %, such as about 20 to 70 wt. % of the total amount of said agent present combines with nickel, calcium, silicon, aluminum, magnesium, sodium and/or potassium to generate a liquid oxide-silicate phase that fluxes and washes substantially all of the remaining vanadium and other ash components. Simultaneously, a third portion e.g. in the range of about 0.1 to 15 wt. %, such as about 2 to 7 wt. %, of the total amount of said ash fusion temperature modifying agent present combines with a portion of the molten ash from the fuel and a minor portion of the refractory lining of said reaction zone to increase the amount of said liquid oxide silicate phase and thereby enhance the removal of the vanadium from the reaction zone. Each of the three sets of reactions previously described go on simultaneously in the reaction zone. Accordingly, if a greater portion of the ash fusion temperature modifying agent goes into the materials formed in either the first or second groups of reactions, than the remainder of the ash fusion temperature modifying agent is divided between the materials formed in the remaining two groups of reactions. Advantageously, the amount of carrier glass produced by the ash fusion temperature modifying agent in the second group of reactions is increased by the third group of reactions taking place between the refractory lining and the ash fusion temperature modifying agent, without affecting the fluidity of the additive.

Advantageously, by the subject process the sulfur content in the gas, and the downstream gas cleaning costs are substantially reduced or possibly completely eliminated. Further, in one embodiment substantially all of the sulfur in the feedstock is converted into the sulfides of silicon, manganese, iron, nickel and mixtures thereof; and said sulfides leave the reaction zone in the slag.

An elemental analysis of the first liquid phase washing agent substantially comprises in wt. % silicon about 0.1 to 4.5, manganese about 0.1 to 60, nickel about 0.1 to 6.5, iron about 0.5 to 70, calcium about 0.0 to 10, and sulfur about 4.0 to 60. A minor amount of at least one of the following extraneous elements may be optionally present in the first liquid phase washing agent in the reaction zone in wt. %: vanadium about 0.01 to 7.8, magnesium about 0.0 to 1.5; aluminum about 0.01 to 2.8, and zirconium about 0.0 to 2.1. Obviously, here as well as elsewhere in the subject specification, if more of one ingredient is present in a specific combination than there is less of the others in the specific combination. All of the ingredients present in a specific combination add up to 100 wt. %. The amount of the first liquid phase washing agent is about 5 to 90 wt. % such as about 10 to 30 wt. %, of the slag. It was unexpectedly found that most of the nickel e.g. about 90 wt. % or more goes into the first liquid phase washing agent. Accordingly, in one embodiment to insure the elimination of harmful nickel subsulfide, the amount of the first liquid phase washing agent comprises at least about 5 wt. % (basis total weight amount of slag).

An elemental analysis of the high melting spinel and oxide lath phases comprises in wt. %: vanadium about 5.0 to 80, iron about 1.0 to 65, nickel about 0 to 2.0, aluminum about 0.1 to 85, and magnesium about 0 to 10. The amount of high melting spinel and oxide lath phases is about 0.1 to 15 wt. % of the slag. An elemental analysis of the liquid oxide silicate phase substantially comprises in wt. %: silicon about 15 to 60, manganese about 0.5 to 65; nickel about 0.0 to 0.5, magnesium about 0.0 to 2.0; aluminum about 0.1 to 35, and sodium and/or potassium about 0.1 to 5.0. The amount of liquid oxide silicate phase is about 10 to 95 wt. such as about 20 to 70 wt. % of the slag. It was unexpectedly found that the first liquid phase washing agent has a strong wetting capability for the high temperature non-flowing vanadium-containing oxide laths and spinels in the reaction zone. This washing agent functions in a completely different manner than that of a typical fluxing additive which may be used, for example to solubilize slag constituents in coal. For example, the first liquid phase washing agent does not solubilize the troublesome vanadium-containing oxide laths and spinels. Rather, it serves as a carrier and washes them out of the reaction zone. The first liquid phase washing agent washes at least a portion, such as from about 5 to 65 wt. %, say about 15 to 30 wt. % of the vanadium-containing contaminants out of the reaction zone of the partial oxidation gas generator. The mixture of the first liquid phase washing agent, the high melting spinel and oxide lath phases, and the liquid oxide silicate phase comprise slag. Substantially all of the remaining vanadium is washed and fluxed by the liquid oxide silicate phase. Combined with the molten slag in the third phase reactions is a small portion of the refractory lining from the reaction zone e.g. about 0.1 to 5.0 wt. % (basis wt. % slag).

The vanadium-containing oxide laths and spinels contain (i) substantially all e.g. 80 to 99 wt. % or a large fraction e.g. 85 to 95 wt. % of the vanadium present in the feed; and (ii) the remainder of the Si and/or Mn, Fe, Al, Mg, Ti and other minor impurities from the ash fusion temperature modifying agent and/or feedstock. In general, the vanadium-bearing compounds tend to concentrate in the high melting spinel and oxide lath phases. In some cases when the amount of this material is greater than 1.0 wt. %, the vanadium-bearing spinels are so abundant in the liquid oxide silicate phase that they actually constitute a more or less continuous mass. It is apparent that the vanadium-bearing spinels form very early in the crystallization sequence. Further, they have very high melting points and the grains composed of major proportions of them are rigid to very viscous at very high temperatures. Refractory wear will increase the amount of liquid oxide silicate phase. The volume concentration of the high melting spinel and oxide lath phase is thereby reduced. Further, their contribution to the increased viscosity of the liquid oxide silicate phase is consequently decreased. The first liquid phase washing agent, in contrast with the liquid oxide silicate phase has a much lower melting point, and a much lower viscosity. However, it also contains very much less of the vanadium-containing spinels. For example, the melting point and viscosity of the first liquid phase washing agent are in the range of about 1850° to 2200° F., and about 5 to 100 poises respectively; whereas, the melting point and viscosity of the liquid oxide silicate phase is in the range of about 2150° F. to 2585° F., and about 45 to 2000 poises, respectively. Any refractory wear will increase the ratio of the liquid oxide silicate phase to the high melting spinel and oxide lath phase thereby decreasing both the melting point and viscosity of the slag. This is one of the benefits of the subject invention.

In another embodiment, it was unexpectedly found that other benefits could be achieved by including in the silicon and manganese-containing ash fusion temperature modifying agent an additional material selected from the group of elements consisting of calcium, sodium, iron, and mixtures thereof. The elements are provided as suitable compounds selected from the groups consisting of oxides, hydroxides, carbonates, bicarbonates, sulfates, nitrates and mixtures thereof. The total amount of said additional materials may be in the range of about 1.0 to 10.0 wt. %, such as about 2.0 to 8.0 wt. % of the ash-fusion temperature modifying agent. The addition of the aforesaid supplemental amount of materials enhances the fluidity of the slag thereby facilitating their removal from the gasifier. The life of the refractory lining is thereby extended, and the gasifier may be operated at a lower temperature.

A suitable amount of silicon and manganese ash fusion temperature modifying agent is introduced into the reaction zone along with the fuel feedstock in order to satisfy the following two ratios: (i) a wt. ratio of said ash fusion temperature modifying agent to ash (noncombustible material) in the reaction zone in the range of about 0.5–7.0 to 1.0, such as in the range of about 1–6 to 1; and (ii) at least 5 parts by weight, such as about 5–20, say 15 parts by weight of said ash fusion temperature modifying agent for each part by weight of vanadium.

Advantageously by the subject process, the first washing phase which is produced in the reaction zone has a low viscosity in comparison with prior art high viscosity slag. This facilitates slag removal. Further, at shut-down of the gasifier, the inside surfaces of the refractory walls of the reaction zone are clean and with substantially no accumulation of vanadium contaminants.

The partial oxidation reaction takes place in a reducing atmosphere at a temperature of about 2200° F. to 3000° F., such as about 2300° F. to 2600° F.; say about 2725° F. to 2825° F. The temperature in the reaction zone is 100° F. to 200° F. above the fluid temperature of the slag. Further, the pressure is in the range of about 2 to 250 atmospheres; $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 30, $H_2O$ 0.1 to 20, $CH_4$ nil to 60, $H_2S$ nil to 0.5, COS nil to 0.05, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition, after removal of the entrained particulate carbon and ash by conventional means e.g. quench cooling and/or scrubbing with water and with or without dewatering, the gas stream may be employed as synthesis gas, reducing gas, or fuel gas.

Another aspect of this invention is that the silicon and manganese-containing ash fusion temperature modifying agent may be selected on the basis of serendipitous catalytic properties during coking in addition to its use in the generation of the washing agent during gasification, as reviously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the ash fusion temperature modifying agent.

In one embodiment of the subject invention the aforesaid mixture of fuel feedstock and the silicon and manganese-containing ash fusion temperature modifying agent are introduced into the partial oxidation gasifier lined with a silicon and manganese-containing refractory. In another embodiment, the silicon and manganese-containing ash fusion temperature modifying agent oxide additive is mixed with the high silicon and sulfur-containing heavy liquid hydrocarbonaceous material having a nickel and vanadium-containing ash and the mixture is then fed into a conventional coking unit to produce petroleum coke. By this means, the finely ground ash fusion temperature modifying agent may be intimately mixed throughout the petroleum coke product. The preferable particle size of the comminuted ash fusion temperature modifying agent and the comminuted petroleum coke is in the range of ASTM E-11 Standard Sieve Designation about 212 microns to 38 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous materials or both to produce a pumpable slurry having a solids content in the range of about 50–65 wt. %. The slurry is then gasified by partial oxidation in the manner previously, described in a free-flow unobstructed vertical gasifier lined with a silicon-containing refractory. Alternatively, the solid materials may be wet ground with the liquid slurry medium. In another embodiment, the mixture of particulate solids may be entrained in a gaseous medium and then introduced into the partial oxidation gas generator. The gaseous transport medium may be selected from the group consisting of steam, $CO_2$, $N_2$, free-oxygen containing gas, recycle synthesis gas, and mixtures thereof.

For example, a mixture comprising high silicon and sulfur-containing high boiling liquid petroleum fuel having a nickel and vanadium-containing ash, and the comminuted mixture of silicon-containing material and manganese-containing material at a temperature in the range of about 650° F. to 930° F. is introduced into a delayed coking zone, for example, by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with a uniformly dispersed silicon and manganese-containing ash fusion temperature modifying agent is removed from the bottom of said delayed coking zone.

In one embodiment, a mixture comprising a high silicon and sulfur-containing high boiling liquid petroleum fuel having a nickel and vanadium-containing ash, and the comminuted silicon and manganese-containing ash fusion temperature modifying agent at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke in admixture with uniformly dispersed silicon and manganese-containing additive is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems discussed for coke. Thus, the invention of introducing a silicon and manganese-containing additive as part of the petroleum processing prior to gasification should, depending on the specific process, produce a feedstock that will be free of the gasification problems mentioned above. Most of these processes employ vacuum distillation as a pretreatment. Accordingly, as described above, the additive comprising a mixture of silicon-containing material and manganese-containing material may be mixed with the vacuum distillation feed having a nickel and vanadium-containing ash. The additive will then emerge from the distillation column in the bottoms stream. In turn, the bottoms stream is the feed stream for the upgrading process. This incorporation of the silicon and manganese-containing additive should not adversely affect these processes, and the silicon and manganese-containing addition agent should ultimately emerge with the vanadium-rich residue stream from each respective process. In all of these processes, this residue stream should be suitable for gasification by partial oxidation.

EXAMPLES

The following examples are offered for a better understanding of the present invention, but the invention is not to be construed as limited thereto.

Synthesis gas is produced in a vertical free-flow unobstructed refractory lined partial oxidation reaction zone, such as that shown and described in coassigned U.S. Pat. No. 3,607,157, which is incorporated herein by reference. The refractory lining comprises in wt. % SiC 75, $Si_3N_4$ 23.4, $SiO_2$ 0.5, $Al_2O_3$ 0.3, $Fe_2O$ 3 0.5, CaO 0.2, and others 0.3. The feedstock comprises an atomized aqueous dispersion of petroleum coke having a nickel and vanadium-containing ash. The petroleum coke feedstock contains about 3.4 wt % of sulfur and more than 350 ppm of silicon. The ash in the petroleum coke comprises about 14.5 wt. % of vanadium, and about 5.8 wt. % of nickel. The petroleum coke also has uniformly dispersed therein a mixture of silicon-containing material and manganese-containing material ash fusion temperature modifying agent comprising about 45 wt. % of silica and about 55 wt. % of manganese oxide. The wt. ratio of silicon and manganese-containing additive to ash is about 6.8 to 1. The weight ratio of silicon and manganese-containing addition agent to vanadium in the reaction zone is about 11 to 1. The solids content of the slurry is about 64.3 wt. %.

The petroleum coke is reacted with a free-oxygen containing gas e.g. air, oxygen-enriched air, substantially pure oxygen, in the presence of a temperature moderator e.g. $H_2O$, $CO_2$, $N_2$ in the partial oxidation reaction zone lined with a substantially silicon-containing material at an autogenous temperature of about 2260° F. and a pressure of about 60 atmospheres. The molten slag droplets are readily separated from the hot effluent gas stream leaving the reaction zone by gravity or by quenching and/or scrubbing the gas stream with water or other gas scrubbing medium. Less than 1.5 wt. % of the slag will comprise refractory lining. Substantially no slag will build up on the gasifier walls.

In another example, Table I below shows the initial deformation temperature and in some cases the softening temperature, and fluid temperature, for (i) petroleum coke ash, (ii) coke ash with silica rich additive, (iii) coke ash with MnO rich additive, (iv) coke ash with silicon and manganese-containing additive, (v) coke ash with silicon and manganese-containing additive and increased silicon content (silica from a silicon-containing refractory), and (vi) coke ash with silicon and manganese-containing additive and an undersirable refractory component ($Al_2O_3$). The data show that the initial deformation for petroleum coke ash of greater than 2700° F. is reduced by about 400° F. by the addition of the glassy additive. The function of the additive is destroyed by the addition of 15% alumina, while unexpectedly the additive still works when silicon is dissolved from the refractory.

TABLE I

| | Reduction of Coke Ash Fusion Temperature | | | | |
|---|---|---|---|---|---|
| Sample No. | Mixture Compounds | Additive + Refractory to Ash Wt. Ratio | Initial Deformation, °F. | Softening, °F. | Fluid, °F. |
| (i) | Petroleum Coke Ash | — | 2700+ | | |
| (ii) | 100% $SiO_2$ | — | 2700+ | | |
| (iii) | 100% MnO | — | 2700+ | | |
| (iv) | 70% MnO + 30% $SiO_2$ | 3:1 | 2268 | 2352 | 2369 |
| (v) | 85% Sample (iv) +15% $SiO_2$ | 3:1 | 2213 | 2372 | 2418 |
| (vi) | 85% Sample (iv) +15% $Al_2O_3$ | 3:1 | 2700+ | | |

The following is offered to better understand the present invention. Briefly, Example one illustrates the problem with removing slag porduced by the gasification of high silicon and sulfur-containing petroleum coke, such as previously described with a silicon and manganese-containing material additive of the tyupe previously described in a gasifier lined with an ineffective magnesite refractory. FIG. one of the drawing illustrates the potential refractory slag problems that might result from such an unsuitable combination. The abundance of spinels is indicative of the high wear rate of the ineffective magnesite refractory.

Example two illustrates the subject invention and shows the uccess of the ash fusion temperature modifying additive omprising a mixture of silicon-containing material and anganese-containing material of the type previously described when used with a compatible hot face silicon-containing efractory liner, of the type previously described. FIG. two shows the reaction product f the coke silicate/vanadium phase with the previously described silicon and manganese-containing additive and the silicon-containing refractory liner, of the type previously described. The localized nature and lesser amounts of the pinel shows the effectiveness of using this specific combination of ash fusion temperature additive and efractory liner for the partial oxidation reaction zone with a vanadium and high silicon-containing petroleum coke feedstock.

Various modifications of the invention as herein before set forth may be made without departing from the spirit and scope thereof, and therefore, only such limitations should be made as are indicated in the appended claims.

I claim:
1. A process for the production of gaseous mixtures comprising $H_2$+CO by the partial oxidation of a feedstock comprising a high silicon and sulfur-containing heavy liquid hydrocarbonaceous fuel having a nickel and vanadium-containing ash, or a high-silicon and sulfur-containing petroleum coke or tar sands having a nickel and vanadium-containing ash, or mixtures thereof; and said feedstock includes a minimum of 0.5 wt. % of sulfur and more than about 20,000 parts per million of silicon; and said ash includes a minimum of 5.0 wt. % vanadium, a minimum of 2.0 wt. % of nickel, and a minor amount of Ca and Na; said process comprising:

(1) mixing together said feedstock and an ash fusion temperature modifying agent comprising a silicon-containing material in the amount of about 30 to 90 wt. % and the remainder substantially comprising a manganese-containing material; wherein the weight ratio of said ash fusion temperature modifying agent to ash in the reaction zone in (2) is in the range of about 0.5–7.0 to 1.0, and there is at least 5 parts by weight of ash fusion temperature modifying agent for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2$+CO and entrained molten slag; wherein said refractory lining comprises in weight percent: silicon-containing material in the range of about 95 to 99.8, iron oxide about 0.1 to 1.0, $Al_2O_3$ about 0.1 to 1.0, CaO about 0 to 0.4, and others about 0 to 1.2; and where simultaneously in said reaction zone separate portions of the said ash fusion temperature modifying agent (i) combine with a portion of said iron, nickel, and sulfur to generate a liquid phase washing agent which washes a portion of the high melting vanadium and oxide phases from the reaction zone, (ii) combine with a portion of said nickel, calcium, silicon, aluminum, magnesium and sodium and/or potassium to generate a liquid oxide-silicate phase that fluxes and washes substantially all of the remaining vanadium and other ash components, and (iii) combine with a portion of the molten ash from the fuel and a minor portion of the refractory lining of said reaction zone to increase the amount of said liquid oxide silicate phase and thereby enhance the removal of the vanadium from said reaction zone; and (3) separating nongaseous materials from the raw effluent gas stream.

2. The process of claim 1 wherein the silicon-containing material in said ash fusion temperature modifying agent is a material selected from the group consisting of fine silica, quartz, volcanic ash, and mixtures thereof.

3. The process of claim 1 wherein the manganese-containing material in said ash fusion temperature modifying agent is a manganese compound selected from the group consisting of oxide, carbide, carbonate, hydroxide, silicate, silicide, sulfate, nitrate, and mixtures thereof.

4. The process of claim 1 where in step (2) separate portions of said ash fusion temperature modifying agent are used as follows: about 4 to 90 wt. % to generate the liquid phase washing agent in (i), about 10 to 95 wt. % to produce the liquid oxide-silicate phase in (ii), and the remainder to increase the amount of liquid oxide silicate phase as provided in (iii).

5. The process of claim 1 wherein the said high silicon and sulfur-containing heavy liquid hydrocarbonaceous fuel having a nickel and vanadium-containing ash feedstock is selected from the group consisting of virgin crude, residua from petroleum distillation and cracking process operations, petroleum distillate, reduced crude, whole crude, asphalt, coal tar, coal derived oil, shale oil, oil sand, and mixtures thereof.

6. The process of claim 1 wherein said high silicon and sulfur-containing heavy liquid hydrocarbonaceous fuel having a nickel and vanadium-containing ash is a pumpable slurry of petroleum coke in a carrier selected from the group consisting of water, liquid hydrocarbon fuel, and mixtures thereof.

7. The process of claim 1 where in (1) said ash fusion temperature modifying agent is introduced into the feed to or the bottoms from a vacuum distillation unit.

8. The process of claim 1 wherein said mixture of ash fusion temperature modifying agent and feedstock from (1) has a particle size of ASTM E-11 Standard Sieve Designation in the range of about 212 microns to 38 microns, or below.

9. The process of claim 1 wherein substantially all of the sulfur in said feedstock is converted into the sulfides of a metal selected from the group consisting of silicon, manganese, iron, nickel and mixtures thereof, and said sulfides leave the reaction zone in the slag.

10. The process of claim 1 where included in the ash fusion temperature modifying agent in (1) is an additional material selected from the group of elements consisting of magnesium, chromium, calcium, sodium, iron, and mixtures thereof.

11. The process of claim 11 wherein said additional materials are provided as compounds in the total amount of about 1.0 to 10.0 wt. % of said ash fusion temperature modifying agent.

12. The process of claim 1 wherein said compounds are selected from the group consisting of oxides, hydroxides, carbonates, bicarbonates, sulfates, nitrates, and mixtures thereof.

13. The process of claim wherein said first liquid phase washing agent is present in the amount of about 5 to 90 wt. %, (basis total weight of said slag).

14. The process of claim 1 wherein said supplemental free oxygen-containing material is selected from the group consisting of substantially pure oxygen, oxygen-enriched air, and air.

15. The process of claim 1 wherein there is present in said first liquid phase washing agent at least one additional element selected from the group consisting of Al, Ca, V, Na, K, and mixtures thereof.

16. A process for the production of gaseous mixtures comprising $H_2+CO$ by the partial oxidation of a feedstock comprising a high silicon and sulfur-containing heavy liquid hydrocarbonaceous fuel having a nickel and vanadium-containing ash, or a high silicon and sulfur-containing petroleum coke or tar sands having a nickel and vanadium-containing ash, or mixtures thereof; and said feedstock includes a minimum of 0.5 wt. % of sulfur and more than about 20,000 parts per million of silicon; and said ash includes a minimum of 5.0 % vanadium, a minimum of 2.0 wt. % of nickel, and a minor amount of Ca and Na; said process comprising:

(I) mixing together a silica-manganese oxide additive with said feedstock; wherein the weight ratio of silica-manganese oxide additive to ash in the reaction zone in (2) is in the range of about 0.5-7.0 to 1.0, and there is at least 5 parts by weight of silica plus manganese oxide for each part by weight of vanadium.

(2) coking said mixture from (1) to produce petroleum coke having a nickel and vanadium-containing ash and having dispersed therein said silica-manganese oxide additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said mixture from (1) at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas strem comprising $H_2+CO$ and entrained molten slag; wherein said refractory lining comprises in wt. % silicon-containing material about 95 to 99.8, iron oxide about 0.1 to 1.0, $Al_2O_3$ about 0.1 to 1.0, CaO about 0 to 0.4, and others about 0 to 1.2, and where in said reaction zone separate portions of the said silica-manganese oxide additive (i) combine with portions of said iron, nickel, and sulfur to generate a liquid phase washing agent, (ii) combine with a portion of said nickel, calcium, silicon, aluminum, magnesium and sodium and/or potassium to generate a liquid oxide-silicate phase that fluxes substantially all of the remaining vanadium and other ash components; and (iii) combine with a portion of the molten ash from the fuel and a minor portion of the lining of said reaction zone to increase the amount of said liquid oxide silicate phase and thereby enhance the removal of the vanadium from said reaction zone; and (5) separating nongaseous material from said hot raw effluent gas stream.

17. The process of claim 16 where in (1) said silica-manganese oxide additive is introduced into the feed to or the bottoms from a vacuum distillation unit.

18. The process of claim 16 where in said mixture of silica-manganese oxide additive and feedstock from (1) has a particle size of ASTM E-11 Standard Sieve Designation in the range of about 212 microns to 38 microns or below.

19. The process of claim 16 wherein said ash-containing heavy liquid hydrocarbonaceous fuel is a high boiling liquid petroleum feed to or the bottoms from a vacuum tower or a fractionator.

20. The process of claim 16 where in (2) the mixture from (1) at a temperature in the range of about 650° F. to 930° F. is introduced into a delayed coking zone where at a temperature in the range of about 800° F. to 895° F. and a pressure in the range of about 20 to 60 psig uncondensed hydrocarbon effluent vapor and steam are removed overhead and said petroleum coke containing said silica-manganese oxide additive is removed from the bottom.

21. The process of claim 16 wherein the first liquid phase washing agent is present in the amount of about 5 to 90 wt. % (basis total weight of said slag).

22. The process of claim 16 where in (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

23. The process of claim 16 where in (5) said nongaseous materials are separated from said hot effluent gas stream by contacting the gas stream from (4) with a water or oil scrubbing medium.

24. The process of claim 16 where included in the silica-manganese oxide additive in (1) is an additional material selected from the group of elements consisting of magnesium, chromium, calcium, sodium, and mixtures thereof in the form of compounds.

25. The process of claim 24 wherein said additional material comprises magnesium which is provided as a compound in the total amount of about 1.0 to 10.0 wt. % of the silica-manganese oxide additive.

26. The process of claim 25 wherein said magnesium compound is an oxide.

27. The process of claim 16 wherein substantially all of the sulfur in said feedstock is converted into the sulfides of a metal selected from the group consisting of silicon, manganese, iron, nickel and mixtures thereof and said sulfides leave the reaction zone in the slag.

28. The process of claim 16 wherein said free-oxygen containing material is selected from the group consisting of substantially pure oxygen, oxygen-enriched air, air, and mixtures thereof.

29. The process of claim 16 wherein there is present in said first liquid phase washing agent at least one additional element selected from the group consisting of Al, Ca, V, Mg, Na, K, and mixtures thereof.

* * * * *